Jan. 9, 1951 R. C. GUNTHER 2,537,460
PRODUCTION OF AZINE DYE IMAGES BY MEANS OF A DEVELOPER
CONTAINING TWO N-SUBSTITUTED-DIAMINO-METANILIC ACIDS
Filed July 15, 1948 4 Sheets-Sheet 1
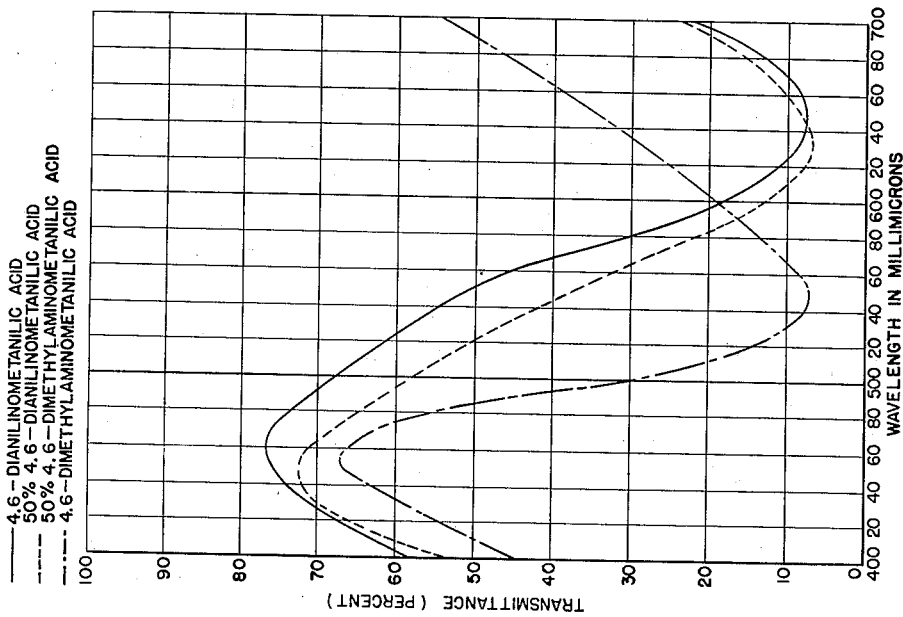
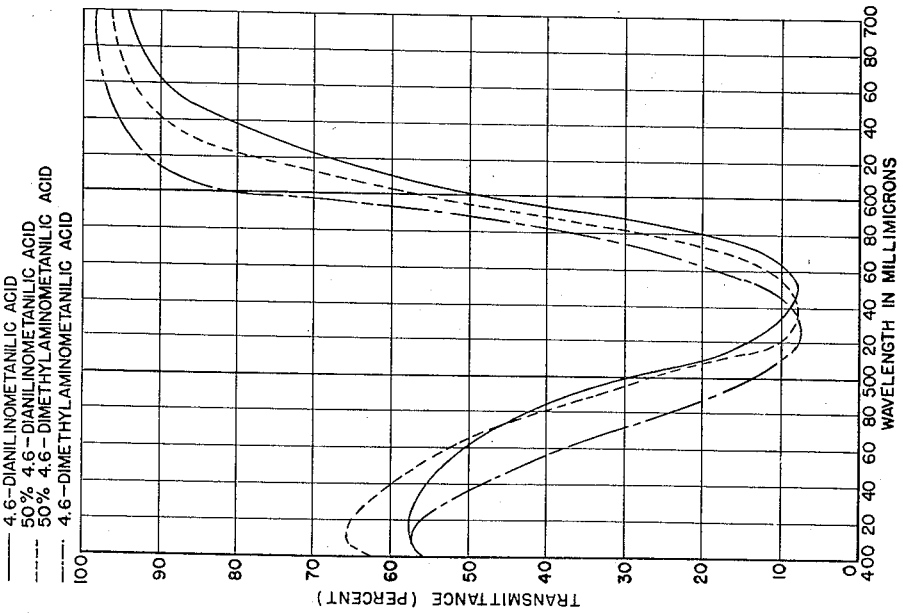
INVENTOR
ROBERT C. GUNTHER
BY
ATTORNEYS

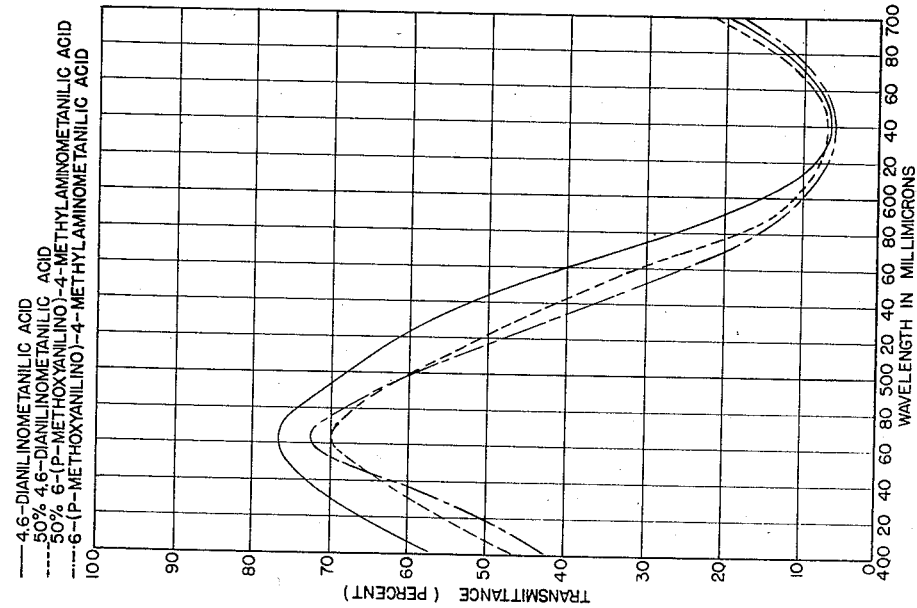
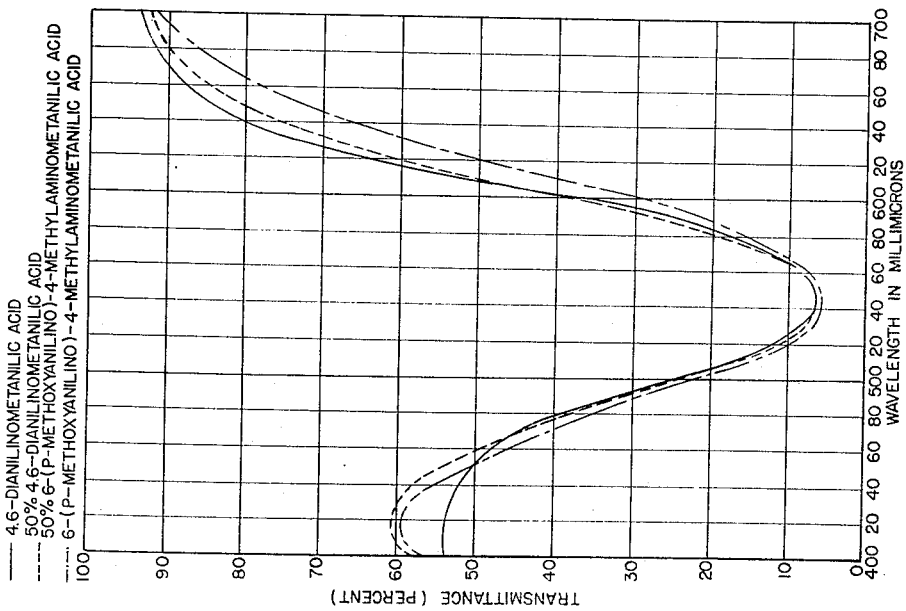

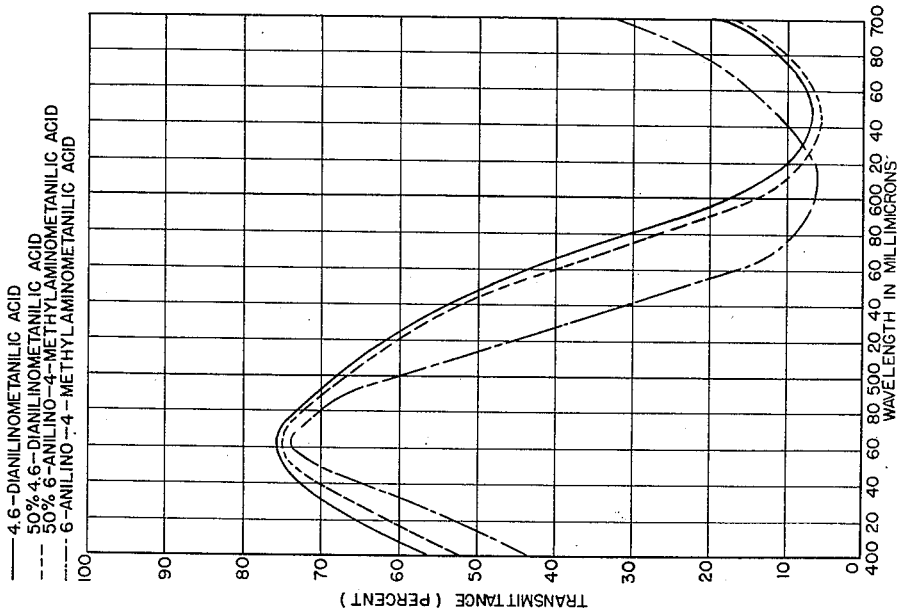
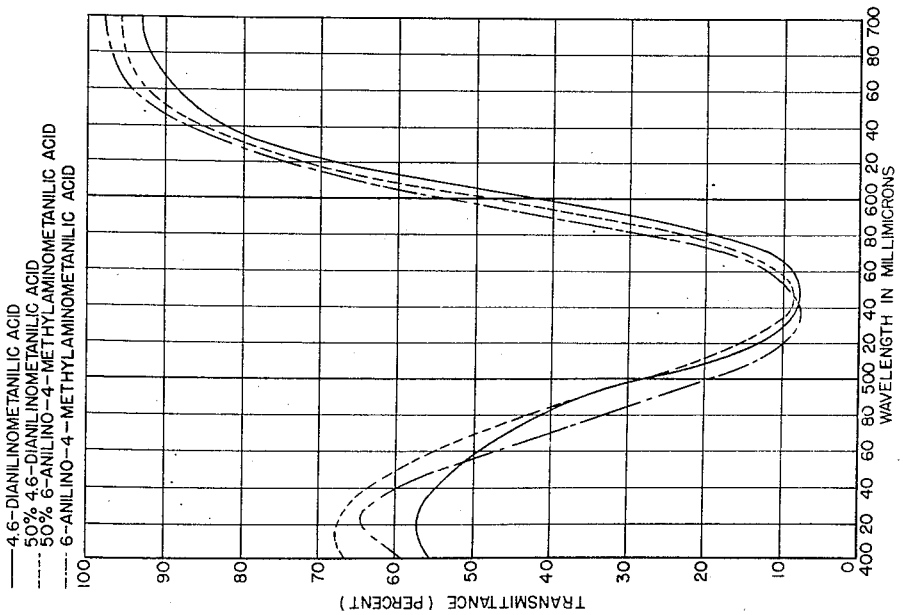

Jan. 9, 1951 R. C. GUNTHER 2,537,460
PRODUCTION OF AZINE DYE IMAGES BY MEANS OF A DEVELOPER
CONTAINING TWO N-SUBSTITUTED-DIAMINO-METANILIC ACIDS
Filed July 15, 1948 4 Sheets-Sheet 4
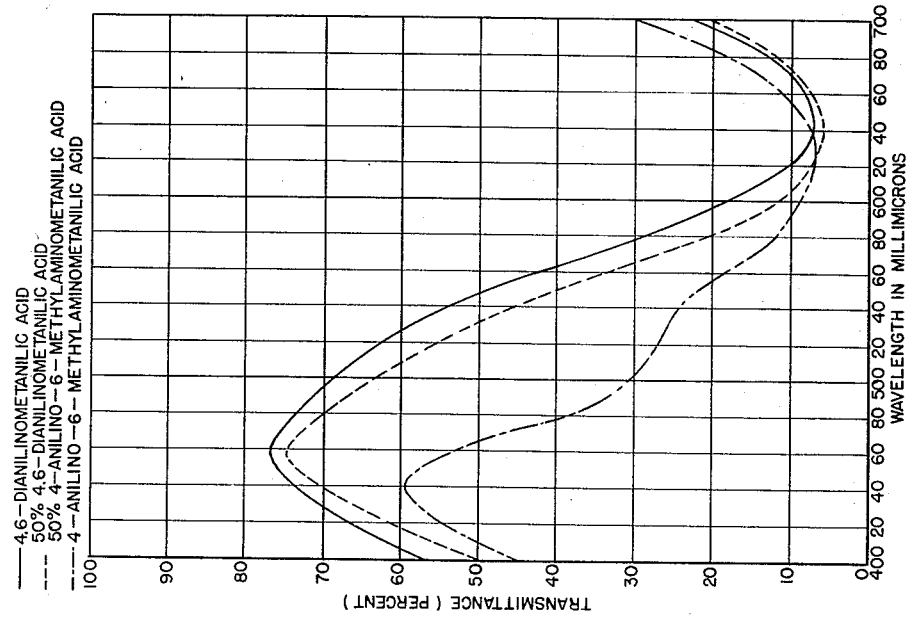
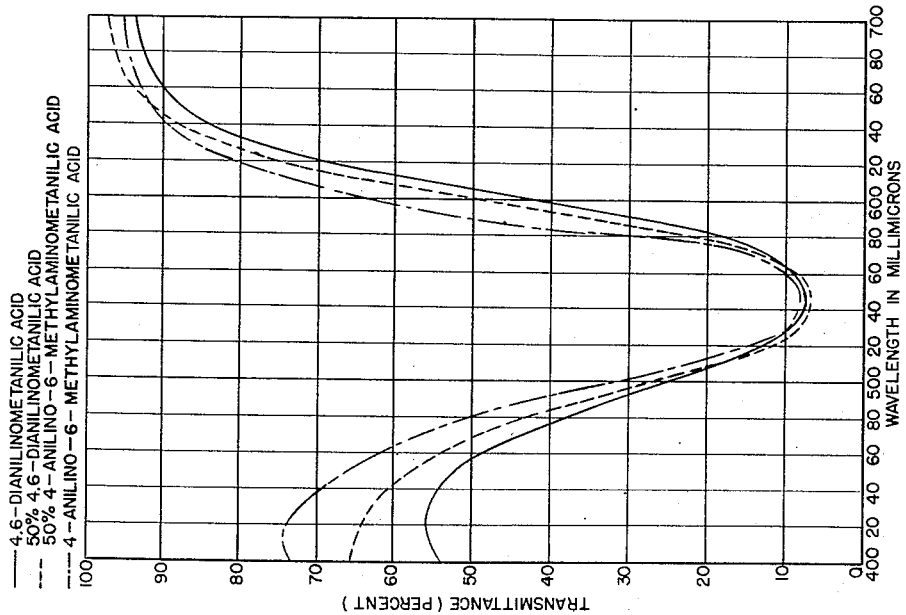
INVENTOR
ROBERT C. GUNTHER
BY
ATTORNEYS Patented Jan. 9, 1951

2,537,460

UNITED STATES PATENT OFFICE 2,537,460

PRODUCTION OF AZINE DYE IMAGES BY MEANS OF A DEVELOPER CONTAINING TWO N-SUBSTITUTED - DIAMINO - META-NILIC ACIDS

Robert C. Gunther, Easton, Pa., assignor to General Aniline & Film Corporation, New York, N. Y., a corporation of Delaware Application July 15, 1948, Serial No. 38,808

10 Claims. (Cl. 95—88)

1

The present invention relates to the preparation of azine dye images, and more particularly to an improvement in the formation of such images by developing an exposed silver halide in the presence of a color former while utilizing as the developer a mixture of two 2.4-diamino-anilines.

The preparation and manufacture of multilayer film comprising three photographic emulsions selectively sensitized to the blue, green and red region of the spectrum and containing color forming components which upon development yield three dye images of the proper characteristics requires careful balancing so that each emulsion may play its proper role in the production of the final picture. This balance may be attained by the selection of emulsions having carefully matched speeds and gradations, and by the proper selection of sensitizing dyes. The difference in activity or coupling energy of the color forming components governs to a marked degree the yield of dye obtained by the development of the exposed silver halide. It is possible to utilize rapid coupling color components with emulsions of low sensitivity and contrast or comparatively slow coupling color components with high speed emulsions. It is also possible to select emulsions which are developable at different rates due to their content of silver iodide or other active substances which accelerate or retard the rate of development and effect suitable combinations of such emulsions with color components of varying rates of coupling.

In copending application Serial No. 640,382, filed on January 10, 1946, by Willy A. Schmidt and Vsevolod Tulagin, now Patent No. 2,486,440, issued November 1, 1949, there is described the production of azine dye images by color forming development while utilizing as the color developer N-substituted-2.4-diamino-anilines and more particularly derivatives of 4.6-diamino metanilic acid. The azine dye images produced in this way are a very marked improvement over the usual quinonimine and azo methine dye images, particularly as regards stability to alkali, acid and to alkaline oxidation.

In the application of this method to a monopack or multilayer film in which the three subtractive dye images, yellow, magenta and cyan are produced in one step of color forming development, it is essential that (1) the resulting dye images be properly balanced in speed and gradation, and (2) the individual dye images possess the most desirable transmission characteristics and approach as closely as possible the ideal requirements for the subtractive method of color synthesis utilized in tri-color photography.

It is recognized that in the usual subtractive multicolor process, the ideal dye images are those in which the dye absorbs the light for which the emulsion in which it was located was sensitized and transmits all the remaining light of the visible spectrum. The yellow dyes generally employed have satisfactory absorption and transmission characteristics. The same is not true, however, of the magenta and cyan dyes since the magentas do not absorb the green sufficiently and usually absorb too much blue light whereas the cyans do not absorb the red sufficiently and absorb a considerable portion of the blue and green.

Difficulties are encountered in the aforementioned azine dye color development method due primarily to the large extent that the color developers vary in their characteristics as developers and in their action in the oxidized form as color forming agents. The particular structure of the color developer selected also has a remarkable influence on the spectral transmissions of the resulting azine dyes. For example, there are certain developers of the aforementioned class which produce the most desirable minus-red or cyan dye images with a given color former but fail to yield a desirable minus-green or magenta dye image with the best available magenta color former. On the other hand, a color developer which produces the most desirable magenta may yield a very unsatisfactory cyan. Furthermore, many of the 2.4-diamino-aniline derivatives do not show a sufficiently high energy of development while others have a tendency to cause stain. These factors all operate to militate against the obtaining of optimum dye images with the azine dye forming color developers.

I have now ascertained that by utilizing a mixture or combination of 2.4-diamino-aniline developers rather than a single developer of this type, the aforestated disadvantages may be overcome while realizing one or more of the following advantages: (1) the rate of color forming development is increased; (2) the dyes produced in a tripack have improved overall spectral characteristics; and (3) the rate of color development may be adjusted so as to achieve improved color balance and gradation. The use of such a mixture of developers to this end, and such developers, accordingly constitute the purposes and objects of the present invention.

The 2.4-diamino-aniline developers, the mixture or combination of which is contemplated for use herein, are typified by the following structural formula:

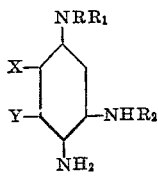

wherein R is hydrogen or alkyl, i. e., methyl, ethyl, propyl, butyl, amyl or the like, and $R_1$ is an aliphatic radical such as alkyl as above, carboxy alkyl such as carboxy methyl, carboxy ethyl and the like, hydroxy alkyl such as hydroxy ethyl, hydroxy propyl and the like, sulfo alkyl such as sulfomethyl, sulfopropyl, sulfobutyl and the like, or an aromatic radical such as aryl, i. e., phenyl, naphthyl and the like, carboxy aryl, i. e., carboxy phenyl, carboxy naphthyl and the like, sulfo aryl, i. e., sulfophenyl, sulfonaphthyl and the like, alkoxy aryl such as methoxy phenyl, methoxy naphthyl, ethoxy phenyl, butyroxy phenyl and the like, alkyl aryl such as toluyl, ethylphenyl, propylphenyl and the like, carboxy alkylaryl, such as carboxy methyl phenyl, carboxy ethyl phenyl and the like, carboxy alkoxy aryl, such as carboxy methoxy phenyl, carboxy ethoxy phenyl, hydroxy alkyl aryl such as hydroxy methyl phenyl, hydroxy ethyl phenyl and the like, and hydroxy alkoxy aryl such as hydroxy methoxy phenyl, hydroxy ethoxy phenyl and the like, $R_2$ is an aromatic or aliphatic radical as illustrated above, and X and Y are hydrogen, alkyl as above, sulfo or carboxy, or together represent the atoms necessary to complete a six-membered isocyclic ring system such as benzo and the like. Preferably the compounds which are utilized are the N-substituted-4.6-diamino-metanilic acids, in which case Y is hydrogen, and X is sulfo.

Preferably one of the developers of such mixture or combination is an energetic non-staining color developer of the 4.6-diamino-metanilic acid class in which a nitrogen atom in the 4- or 6-position is substituted by an aryl radical. The other component is also generally of the 4.6-diamino metanilic acid class characterized by the presence of an alkyl substituent on one of the nitrogen atoms in the 4- or 6-positions. The compounds of the first class may be more precisely represented by the following formula:

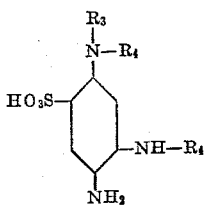

wherein $R_4$ is an aromatic radical such as aryl, i. e., phenyl; toluyl, alkoxy aryl, i. e., methoxyphenyl, ethoxyphenyl; sulfo aryl, i. e., sulfophenyl, sulfotoluyl; carboxy alkylaryl, i. e., carboxy methyl phenyl; hydroxy alkylaryl, i. e., hydroxy methylphenyl, hydroxy ethylphenyl; hydroxy alkoxy aryl, i. e., hydroxy ethoxy phenyl; carboxy alkoxy aryl, i. e., carboxy methoxy phenyl; an aliphatic radical such as alkyl, i. e., methyl, ethyl, propyl, butyl, amyl and the like; hydroxy alkyl, i. e., hydroxy ethyl, hydroxy methyl and the like; carboxy alkyl, i. e., carboxy methyl, carboxy ethyl and the like; sulfoalkyl, i. e., sulfo methyl, sulfo ethyl and the like, $R_3$ is hydrogen or alkyl as above, one $R_4$ always being alkyl.

Developers of the second class may be more precisely characterized by the following formula:

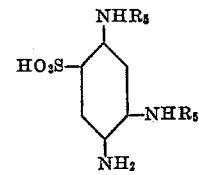

wherein $R_5$ is aromatic as above, hydroxy alkyl as above, carboxy alkyl as above, and sulfoalkyl as above, one $R_5$ always being aryl.

As illustrative of the first class of developers, reference is made to 4-methylamino-6-phenyl-amino-metanilic acid of the following formula:

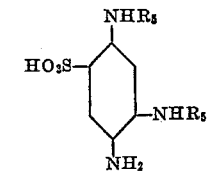

4.6 - bis-(monomethylamino)-metanilic acid of the following formula:

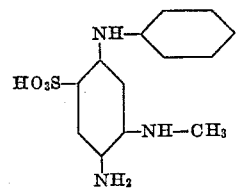

4 - phenylamino-6-methylamino-metanilic acid, 4 - methylamino - 6 - (4'methoxyephenyl-amino) metanilic acid of the formula:

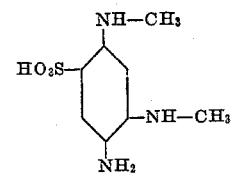

4 - phenylamino-6-ethylamino-metanilic acid, 4-(4'sulfo phenylamino) - 6 - dimethylamino-metanilic acid of the formula:

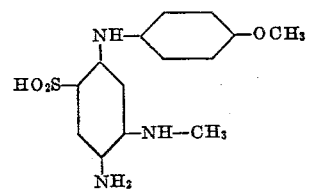

4 - (4' - β-hydroxy-ethoxy-phenylamino) - 6-methylamino-metanilic acid of the formula:

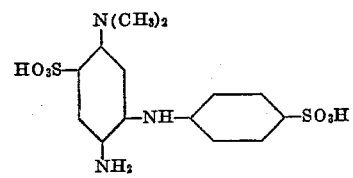

4 - ethylamino-6-(β-hydroxy ethylamino)-metanilic acid, a 4-butylamino-6-(4'-hydroxyethyl-phenylamino)-metanilic acid, 4 - (4'-carboxymethylphenylamino)-6-ethylamino-metanilic acid of the formula:

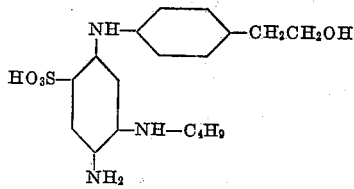

and the like.

The second class of developing components referred to above is illustrated by 4.6-bis-(phenylamino)-metanilic acid, 4-(β-hydroxy ethylamino)-6-phenylamino-metanilic acid of the formula:

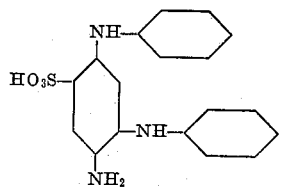

4-carboxy-methylamino-6-phenylamino-metanilic acid of the formula:

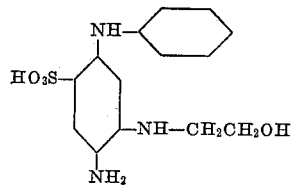

4-phenylamino-6-(4'-carboxymethoxyphenylamino)-metanilic acid, 4-(β-sulfoethylamino)-6-phenylamino-metanilic acid of the formula:

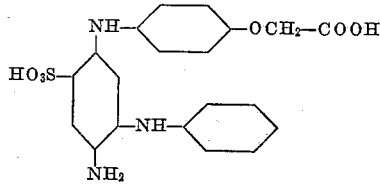

4.6-di(3'-carboxymethoxyphenylamino)-metanilic acid of the formula:

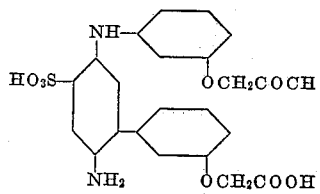

and the like.

The relative proportions of the two components of the developer may vary to suit the exigencies of the particular case depending upon the color formers used and the silver halide emulsions involved. For practical purposes the developers are used in the ratio of one part of the first class to from one to two parts of the second class.

The mixed developers, as may have been expected, are intermediate in stain producing properties and energy of development with the properties of the individual components thereof. It was not expected, however, that through some mutual cooperation between the individual components of the developer mixture, the azine dye forming process would be markedly improved. For instance, it was surprising that in nearly all cases, the magenta dyes produced from the mixtures with suitable color formers were superior to the magenta dyes obtained from the individual components thereof. This result is achieved while simultaneously obtaining cyan dyes which are at most only slightly inferior to the best cyan dye obtainable from the better of the two components of the mixture. Thus, by using a mixture of 4.6-bis-(phenylamino)-metanilic acid and 4.6-bis-(methylamino)-metanilic acid with anisyl-J-acid as the color former, a cyan dye image is obtained which very closely resembles the image obtained from the 4.6-bis-(phenylamino)-metanilic acid alone and is far superior to the corresponding dye image obtained from the 4.6-bis-(methylamino) metanilic acid alone. The same mixture with 8-hydroxy-quinoline as the color former yields a magenta image which is superior in blue transmission to that obtained by the use of either of the aforesaid developing substances per se. It is accordingly possible by proper selection of the individual color developing substances for the mixture used to provide combinations which lead to definite improvements in the overall developing action of the solution and enable one to obtain proper balance and speed upon color development or to improve the spectral characteristics of one or more of the images involved in the production of the colored picture.

The developers are capable of reducing any exposed silver halide such as a latent image, a reversed image, a bleached image, or the like. Where such reduction takes place in the presence of a color forming component of the usual type, i. e., those containing a reactive methylene group, a phenolic hydroxy group or a primary amino group bound to an aryl ring, an azine dye image is formed in situ with the silver image. Examples of such color formers are:

2-benzcarbamyl naphthol-7
3.6-disulfo-8-benzsulfonylamino naphthol-1
3-phenylamino-aniline
8-benzsulfonylamino naphthol-1
3-sulfo-6-aminonaphthol-1
3-sulfo-6-phenylaminonaphthol-1
3-sulfo-6-(p-methoxy-phenylamino)-naphthol-1
8-hydroxy quinoline
3-sulfo-6-oleylamino-naphthol-1
Naphthsultam acid
3-sulfo-7-phenylaminonaphthol-1
1.8-bis-(benzsulfonyl amino)-naphthalene
6-bromo-8-hydroxy quinoline
6-sulfo-8-hydroxy quinoline
6-nitro-8-hydroxy quinoline
2-(3-decylsulfonamidophenyl)-8-hydroxy-cinchoninic acid
2-methyl-4.5'-dihydroxy-7.8-benzoquinoline
2-methyl-4.4'-dihydroxy-7.8-benzoquinoline
and the like.

The color developers referred to hereinabove in which different substituent groups are present on the nitrogen atoms in 4- and 6-positions may be prepared by the general method described in my copending application Serial No. 793,532, filed December 23, 1947, now abandoned.

The process of producing azine dye images by the mixture of developers may be effected in various ways. For instance, the color forming component when diffusing may be located in the developer. On the other hand, the color former in non-diffusing form may be located in the emulsion. Multilayer film, each layer containing a non-diffusing color former may be used and the entire film color developed to the desired subtractive dyestuff images in a single color forming development step while using the aforesaid mixtures.

While an alkali and the mixture of the N-substituted 4.6-diamino-metanilic acids are the essential components of the developer, it is preferred that the developer also contain the usual adjuncts such as an alkali metal bromide, i. e., potassium bromide, sodium bromide and the like, and an alkali metal sulfite such as sodium sulfite and the like. In some cases it has also been found that better results accrue when there is present in the developer a coupling aid in the form of an organic base such as ethylene diamine, pyridine, quinoline, benzylamine and the like.

Reference is made to the accompanying self-explanatory drawing which discloses the spectral transmission curves of magenta and cyan dyes obtained from mixtures of developers of the type contemplated herein and from the individual components of the developers. It is evident from the drawing that the magenta dyes produced with the mixtures involved are superior to the magenta dyes obtained from the individual developers and that the cyan dyes produced from the mixtures are at most only slightly inferior to the best cyan dye obtainable from the individual developer components.

The following examples serve to illustrate the invention, but it is to be understood that the invention is not restricted thereto.

*Example I*

A photographic silver bromide emulsion containing 2 - (3 - decylsulfonamidophenyl) - 8 - hydroxy cinchoninic acid as a non-diffusing color former is exposed, a negative silver image developed, re-exposed, and the residual silver halide developed for 10 minutes in a solution of the following composition:

| | | |
|---|---|---|
| Sodium sulfite | grams | 60 |
| Potassium carbonate | do | 20 |
| Ethylene diamine | cc | 30 |
| 4.6-bis(phenylamino)-metanilic acid | grams | 1.5 |
| 4 - methylamino-6-phenylamino-metanilic acid | grams | 1.5 |
| Water | cc | 1000 |

The film after development is bleached with potassium ferricyanide and fixed in an acid-hardening hypo solution. There is thus obtained a brilliant magenta azine dye image which is stable to acid, alkali and alkaline oxidizing agents.

*Example II*

The procedure is the same as in Example I excepting that the 4-methylamino-6-phenylamino-metanilic acid is replaced by 4.6-bis-(methylamino)-metanilic acid.

*Example III*

A photographic silver bromide emulsion is exposed and a negative silver image developed therein. The residual silver bromide is re-exposed and developed in a developer of the following composition:

| | | |
|---|---|---|
| Sodium carbonate | grams | 60 |
| Sodium sulfite | do | 40 |
| Potassium bromide | do | 2.5 |
| Pyridine | cc | 12 |
| 4.6-bis(phenylamino)-metanilic acid | grams | 1.5 |
| 4-methylamino-6-phenylamino-metanilic acid | grams | 1.5 |
| 8 hydroxy quinoline | do | 3 |
| Water | cc | 1000 |

The film after development is bleached in potassium ferricyanide and fixed in an acid hardening hypo solution. A positive azine dye image, magenta in color, is thereby obtained, such image having the characteristics noted in Figure 7.

*Example IV*

The procedure is the same as in Example III excepting that the 8-hydroxyquinoline is replaced by p-anisyl-J-acid. After working up the film as in Example III, there is obtained a positive azine dye image, cyan in color and having the characteristics noted in Figure 8.

*Example V*

A photographic silver bromide emulsion is exposed and developed in a developer of the following composition:

| | | |
|---|---|---|
| Sodium carbonate | grams | 60 |
| Sodium sulfite | do | 40 |
| Potassium bromide | do | 2.5 |
| Pyridine | cc | 12 |
| 4.6-bis(phenylamino)-metanilic acid | grams | 1.5 |
| 4.6-bis-(methylamino)-metanilic acid | grams | 1.5 |
| 8-hydroxyquinoline | do | 3 |
| Water | cc | 1000 |

The film is bleached with potassium ferricyanide and fixed in an acid-hardening hypo solution. There is thus obtained an azine dye image, magenta in color and having the characteristics noted in Figure 1.

*Example VI*

The procedure is the same as in Example V excepting that the 8-hydroxyquinoline is replaced by p-anisyl-J-acid. By working up the film after development as in Example V, a cyan azine dye image having the characteristics of Figure 2 is obtained.

*Example VII*

A photographic silver bromide emulsion is exposed and developed in a developer of the following composition:

| | | |
|---|---|---|
| Sodium carbonate | grams | 60 |
| Sodium sulfite | do | 40 |
| Potassium bromide | do | 2.5 |
| Pyridine | cc | 12 |
| 4.6-bis-(phenylamino)-metanilic acid | grams | 1.5 |
| 4-methylamino-6-(4'-methoxy-phenyl-amino)-metanilic acid | grams | 1.5 |
| 8-hydroxyquinoline | do | 3 |
| Water | cc | 1000 |

The film is bleached with potassium ferricyanide and fixed in an acid-hardening hypo solution. There is thus obtained an azine dye image, magenta in color and having the characteristics noted in Figure 3.

*Example VIII*

The procedure is the same as in Example VII, excepting that the 8-hydroxyquinoline is replaced by p-anisyl-J-acid. By working up the film after development, as in Example VII, a cyan dye image is obtained which has the characteristics noted in Figure 4.

*Example IX*

A photographic silver bromide emulsion is exposed and developed in a developer of the following constitution:

| | | |
|---|---|---|
| Sodium carbonate | grams | 60 |
| Sodium sulfite | do | 40 |
| Potassium bromide | do | 2.5 |
| Pyridine | cc | 12 |
| 4.6-bis-(phenylamino)-metanilic acid | grams | 1.5 |
| 4-methylamino-6-phenylamino-metanilic acid | grams | 1.5 |
| 8-hydroxyquinoline | do | 3 |
| Water | cc | 1000 |

The film after its development is bleached in potassium ferricyanide and fixed in an acid-hardening hypo solution. A magenta dyestuff image having the characteristics noted in Figure 5 is thereby obtained.

*Example X*

The procedure is the same as in Example IX excepting that the 8-hydroxyquinoline is replaced by p-anisyl-J-acid. By working up the developed film as in Example IX there is obtained a cyan dye image having the characteristics described in Figure 6.

*Example XI*

A photographic silver bromide emulsion containing 2-(8-hydroxy cinchoninoyl)-amido-6-stearoylamido-toluene-4-sulfonic acid as a color former is exposed and developed in a developer of the following composition:

| | | |
|---|---|---|
| Sodium carbonate | grams | 60 |
| Sodium sulfite | do | 40 |
| Potassium bromide | do | 2.5 |
| Pyridine | cc | 12 |
| 4-($\beta$-hydroxyethylamino)-6-phenylamino metanilic acid | grams | 3 |
| 4-methylamino-6-phenylamino-metanilic acid | grams | 1.5 |
| Water | cc | 1000 |

The film after development is bleached in a ferricyanide bleach and fixed in an acid-hardening hypo. A magenta dyestuff image, brilliant in color, is thereby obtained.

Various modifications of the invention will occur to workers skilled in this art, and I therefore do not intend to be limited in the patent granted except as required by the appended claims.

I claim:

1. The process of producing azine dye images which comprises exposing a silver halide emulsion and color developing the same in the presence of a color former capable of coupling with the oxidation products of a primary aromatic amino developer to form a dye image, with a developer mixture containing two different 2,4-diamino anilines selected from the class consisting of those of the following formulae:

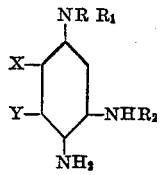

and

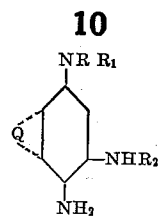

in which R is selected from the class consisting of hydrogen and alkyl, $R_1$ is selected from the class consisting of aliphatic and aromatic radicals, $R_2$ is selected from the class consisting of aromatic radicals, a ring carbon atom of which is directly linked to the nitrogen atom, and aliphatic radicals, a carbon atom of which is directly linked to the nitrogen atom, said carbon atom being substituted by at least two hydrogen atoms, X and Y are selected from the class consisting of hydrogen, alkyl, sulfo, and carboxy, and Q represents the atoms necessary to complete a six-membered isocyclic ring system.

2. Process as defined in claim 1 wherein the developers of said mixture are 4.6-diamino-metanilic acids, one component of the mixture having an aryl substituent on a nitrogen atom thereof and the other having an alkyl substituent on a nitrogen atom thereof.

3. The process as defined in claim 1 wherein one of said 2,4-diamino anilines is an energetic non-staining developer.

4. A photographic developer for producing brilliant azine dye images containing as the active developing ingredients a mixture of two different 2.4-diamino-anilines selected from the class consisting of those of the following formulae:

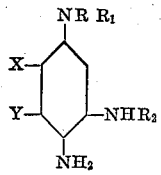

and

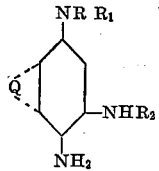

in which R is selected from the class consisting of hydrogen and alkyl, $R_1$ is selected from the class consisting of aliphatic and aromatic radicals, $R_2$ is selected from the class consisting of aromatic radicals, a ring carbon atom of which is directly linked to the nitrogen atom, and aliphatic radicals, a carbon atom of which is directly linked to the nitrogen atom, said carbon atom being substituted by at least two hydrogen atoms, X and Y are selected from the class consisting of hydrogen, alkyl, sulfo, and carboxy, and Q represents the atoms necessary to complete a six-membered isocyclic ring system.

5. The composition as defined in claim 4 wherein the developers of said mixture at 4.6-diamino-metanilic acids, one component having an aryl substituent on a nitrogen atom thereof and the other component having an alkyl substituent on a nitrogen atom thereof.

6. The composition as defined in claim 4 wherein one of the 2,4-diamino anilines is an energetic non-staining developer.

7. The process of producing azine dye images which comprises color developing an exposed silver halide emulsion in the presence of a color former capable of coupling with the oxidation products of a primary aromatic amino developer to form a dye image, with a developer mixture of two 2,4-diamino anilines, one of which has the formula:

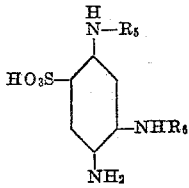

wherein $R_5$ is an aromatic radical and $R_6$ is selected from the class consisting of aromatic radicals, a ring carbon atom of which is directly linked to the nitrogen atom, and alkyl radicals containing a water solubilizing group, a carbon atom of said alkyl radical being directly linked to the nitrogen atom, said carbon atom being substituted by at least two hydrogen atoms and the other of which has the formula:

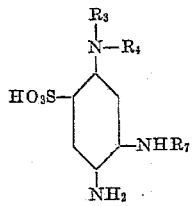

in which $R_3$ is selected from the class consisting of hydrogen and alkyl, $R_4$ is selected from the class consisting of aliphatic and aromatic radicals, and $R_7$ is selected from the class consisting of aromatic radicals in which a ring carbon atom is directly linked to the nitrogen atom and aliphatic radicals, a carbon atom of which is directly linked to the nitrogen atom, said carbon atom being substituted by at least two hydrogen atoms, one of said radicals $R_4$ and $R_7$ always being alkyl.

8. A photographic developer for producing brilliant azine dye images containing as the active developing ingredients a mixture of two different 2,4-diamino anilines, one of which has the following formula:

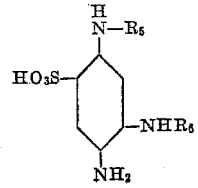

wherein $R_5$ is an aromatic radical and $R_6$ is selected from the class consisting of aromatic radicals, a ring carbon atom of which is directly linked to the nitrogen atom, and alkyl radicals containing a water solubilizing group, a carbon atom of said alkyl radical being directly linked to the nitrogen atom, said carbon atom being substituted by at least two hydrogen atoms and the other of which has the formula:

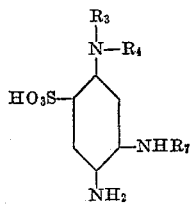

in which $R_3$ is selected from the class consisting of hydrogen and alkyl, $R_4$ is selected from the class consisting of aliphatic and aromatic radicals, and $R_7$ is selected from the class consisting of aromatic radicals in which a ring carbon atom is directly linked to the nitrogen atom and aliphatic radicals, a carbon atom of which is directly linked to the nitrogen atom, said carbon atom being substituted by at least two hydrogen atoms, one of said radicals $R_4$ and $R_7$ always being alkyl.

9. The process as defined in claim 1 wherein the mixture of the two 2,4-diamino anilines is made up of 4,6-bis-(phenylamino)-metanilic acid and 4-methylamino-6-phenylamino-metanilic acid.

10. The composition as defined in claim 4 wherein the mixture of the two different 2,4-diamino anilines is made up of 4,6-bis-(phenylamino)-metanilic acid and 4-methylamino-6-phenylamino-metanilic acid.

ROBERT C. GUNTHER.

REFERENCES CITED

The following references are of record in the file of this patent:

UNITED STATES PATENTS

| Number | Name | Date |
| --- | --- | --- |
| 2,301,387 | Evans et al. | Nov. 10, 1942 |
| 2,414,491 | Tulagin | Jan. 21, 1947 |
| 2,417,514 | Neumann | Mar. 18, 1947 |
| 2,449,919 | Weissberger | Sept. 21, 1948 |

Certificate of Correction

Patent No. 2,537,460  January 9, 1951

ROBERT C. GUNTHER

It is hereby certified that error appears in the printed specification of the above numbered patent requiring correction as follows:

Column 5, lines 2 to 10, strike out the words and colon "of the formula:" and the formula:

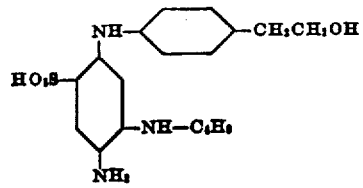

and insert the same after "acid" in column 4, line 75; column 5, lines 15 to 24, strike out the words and colon "of the formula:" and the formula:

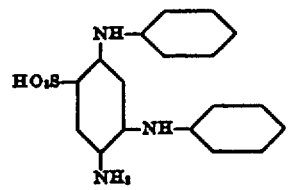

and insert the same after "acid" in column 5, line 14; same column 5, lines 26 to 34, strike out the words and colon "of the formula:" and the formula:

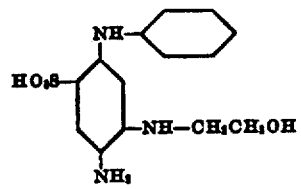

and insert the same after "acid" in column 5, line 15; same column 5, lines 37 to 45, strike out the words and colon "of the formula:" and the formula:

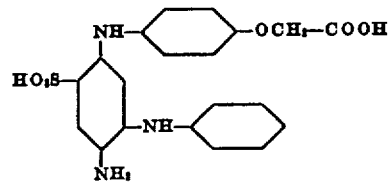

and insert the same after "acid" in line 36, same column; column 8, line 3, for "4-methylamino-6-phenylamino-metanilic" read *4 - phenylamino - 6 - methylamino-metanilic*;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*